Sept. 29, 1959  R. W. BEYLAND  2,906,118
DEVICES FOR MEASURING PHONOGRAPH STYLUS PRESSURE
Filed Jan. 27, 1956
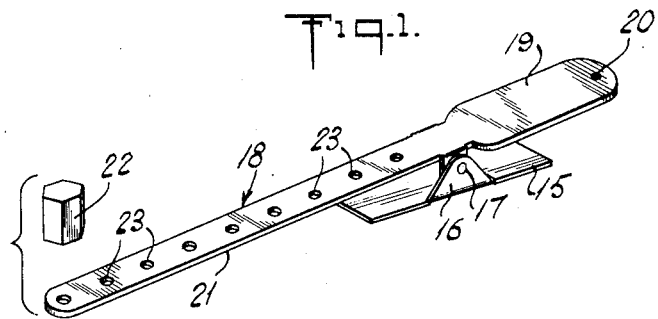
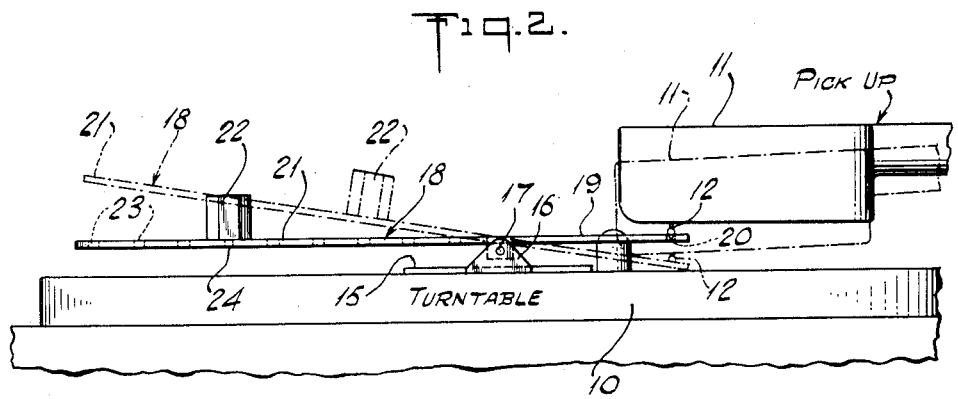
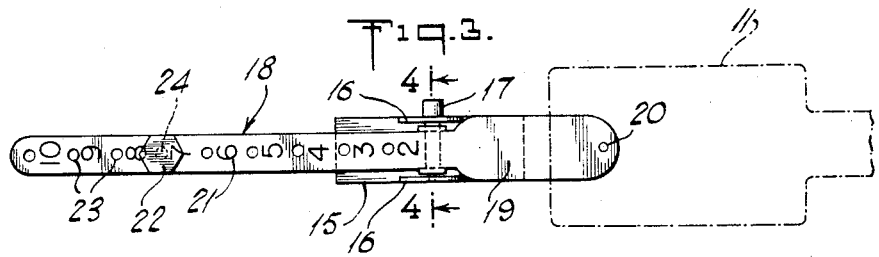
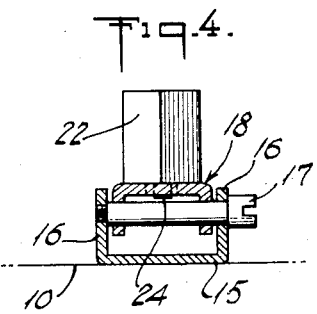
INVENTOR
ROBERT W. BEYLAND
BY
ATTORNEY

# United States Patent Office 2,906,118
Patented Sept. 29, 1959

2,906,118

DEVICES FOR MEASURING PHONOGRAPH STYLUS PRESSURE

Robert W. Beyland, Yalesville, Conn.

Application January 27, 1956, Serial No. 561,726

2 Claims. (Cl. 73—141)

The present invention relates to devices for measuring phonograph stylus pressure.

Modern vinyl micro-groove records employ a relatively soft material with very small grooves. The small stylus or needle employed may produce relatively high p.s.i. pressure on the record should the load become excessive. It has therefore been found highly desirable to control the needle or stylus pressure on the record.

Various devices have been suggested for the purpose, but in general they are unsatisfactory because of such features as: spring loading subject to temperature variation; impossibility of adjusting the device to be truly responsive to stylus pressure; bending of parts which set up inaccuracies; and inability to adjust to preselected pressures best for the equipment being used.

The present invention overcomes these objections. The overall height of the device is of the order of one quarter of an inch, ensuring a minimum shift of the pickup out of playing position while testing pressure. It has a minimum of friction and is unaffected by temperature. Also, the measuring can be made at any desired pressure of from one to ten grams, which covers the entire range of needle pressures employed.

According to the present invention a lever located on the turntable supports at one end the needle and pickup very close to the table and the load imposed by the needle on the lever is counterbalanced by a shiftable weight carried by the other end of the lever. To reduce the size of the device the lever is preferably out of balance.

The accompanying drawings show for purposes of illustrating the present invention, one embodiment in which the invention may take form, it being obvious that the drawings are illustrative of the invention rather than limiting the same.

In the accompanying drawings:

Figure 1 is a perspective view of the stylus pressure gage with the counterweight detached from the lever;

Figure 2 is a side elevational view of the gage placed on a turntable and balancing the pickup;

Figure 3 is a top plan view; and

Figure 4 is a section on the line 4—4 of Figure 3.

In the drawings a phonograph turntable is illustrated at 10 and convential pickup at 11. The stylus or needle is indicated at 12. The pickup arm forms part of the phonograph and is adapted to shift over the record and to be adjusted to vary the stylus pressure. Such mechanisms are well known and not illustrated here.

As shown in the drawings the device employs a flat plate 15 adapted to be placed on the turntable and having upwardly bent ears 16 which receive a pivot pin 17 on which is mounted a lever 18. The lever has a short arm 19 with a stylus or needle receiving spot such as a hole 20, and a long arm 21 on which a counterweight 22 may be placed at various distances from the pivot. When no extraneous load is placed on the lever, it is preferably out of balance by one gram.

Preferably the lever has regularly spaced holes 23 adapted to receive a small centering pin 24 in the counterweight.

The device is preferably made of stiff sheet aluminum. It has a minimum of friction and is unaffected by changes in temperature. It has an overall height of about ¼ inch. The distance from the needle hole to the pivot is preferably about 1.36 inch, the spacing of the holes .359 inch and the weight of the counterweight 3.9 grams. With this arrangement it is possible to determine needle pressure in nine one gram steps from one gram to ten grams. When the counterweight is the other side up, it may slide along the lever to make closer estimations of stylus pressure. By adjusting the pickup counterbalancing mechanism in the phonograph, any desired needle pressure may be assured. The difference in height of the pickup when shifted to the playing position is so slight that the measured pressure is an accurate showing of actual needle pressure when the record is being played. A heavier counter weight will increase the range.

Since it is obvious that the invention may be embodied in other forms and constructions within the scope of the claims, I wish it to be understood that the particular form shown is but one of these forms, and, various modifications and changes being possible, I do not otherwise limit myself in any way with respect thereto.

What is claimed is:

1. A device for determining the pressure imposed by a pickup carried stylus on a phonograph record on a turntable, comprising a lever of thin, flat, light-weight material, means to support the lever from the turntable and slightly spaced above the upper surface thereof for rocking about an axis nearer one end than the other, said spacing generally corresponding to the distance of the stylus from the turntable when in engagement with the record, the mass distribution of the lever being such that the ends have a predetermined imbalance, the short end of the lever having a stylus receiving spot at a predetermined distance from the axis and adapted to be placed under the pickup so that the normal stylus load is placed on the short end of the lever to produce a predetermined turning movement which corresponds to stylus pressure on a record on the turntable, and a counter weight of known mass adapted to rest on the long arm of the lever at varying distances from the axis to oppose the stylus pressure imposed by the pickup and balance the lever system, the long arm being graduated to indicate the stylus pressure corresponding with the position of the counterweight, the support being a flat plate with upwardly bent ears and the lever being a flat strap with downwardly bent ears and wherein the pivot is a pin extending through a hole in each ear.

2. A device for measuring the pressure imposed by a phonograph pickup on a phonograph record supported by a turntable comprising an elongated lever of light weight material, said lever having a relatively long narrow section and a relatively short widened section, a pair of downwardly extending ears formed integrally with said lever and positioned at a point adjoining the juncture of the two lever sections, an elongated base member, a pair of ears extending upwardly from and secured to the sides of said base member, the last said ears being spaced apart a distance substantially equivalent to the distance between the depending ears, a pin extending through both sets of ears to rockably support said lever on said base, said short widened section of the lever being positioned above the base a distance generally of the order of the stylus-turntable distance when the stylus is in engagement with a record, the elongated narrow section of said lever having a plurality of spaced holes, a counterweight of known mass having a pin extending from one surface thereof for slidable engagement with the last said holes, and pick-up engaging means on the widened lever section, the position of said counterweight relative to said pin determining the weight of the pickup engaging the widened lever section when the lever is in a substantially horizontal position.

References Cited in the file of this patent

UNITED STATES PATENTS

| | | |
|---|---|---|
| 418,708 | Fitch | Jan. 7, 1890 |
| 1,531,642 | Bragin | Mar. 31, 1925 |
| 1,544,432 | Carlstedt | June 30, 1925 |
| 1,659,641 | Smith | Feb. 21, 1928 |
| 2,687,643 | Mortimer | Aug. 31, 1954 |

FOREIGN PATENTS

| | | |
|---|---|---|
| 397,522 | Great Britain | Aug. 25, 1933 |